(12) United States Patent
Matsushita

(10) Patent No.: US 7,457,070 B2
(45) Date of Patent: Nov. 25, 2008

(54) APPARATUS FOR CONTROLLING SPACE BETWEEN HEAD AND MEDIUM

(75) Inventor: Hiroki Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 11/442,892

(22) Filed: May 30, 2006

(65) Prior Publication Data

US 2007/0183078 A1    Aug. 9, 2007

(30) Foreign Application Priority Data

Feb. 7, 2006    (JP)    ............... 2006-030191

(51) Int. Cl.
*G11B 21/02* (2006.01)
(52) U.S. Cl. ....................................... 360/75
(58) Field of Classification Search ............. None
See application file for complete search history.

(56) References Cited

U.S. PATENT DOCUMENTS 4,931,887 A * 6/1990 Hegde et al. ............. 360/75
5,130,866 A * 7/1992 Klaassen et al. .......... 360/75
5,488,519 A * 1/1996 Ishida et al. ........... 360/77.03
6,359,746 B1 * 3/2002 Kakekado et al. ......... 360/75
6,415,238 B1 * 7/2002 Ottesen et al. ........... 702/109
6,529,342 B1 * 3/2003 Feng et al. ............... 360/75
7,233,451 B2 * 6/2007 Baumgart et al. .......... 360/25

FOREIGN PATENT DOCUMENTS

| JP | 55-038690 | 3/1980 |
| JP | 61-113117 | 5/1986 |
| JP | 6-203510 | 7/1994 |
| JP | 9-091911 | 4/1997 |
| JP | 2004-518238 | 6/2004 |
| JP | 2005-032429 | 2/2005 |
| WO | WO 02/059880 | 8/2002 |

* cited by examiner

*Primary Examiner*—K. Wong
(74) *Attorney, Agent, or Firm*—Greer, Burns & Crain, Ltd.

(57) ABSTRACT

A voltage applying unit applies a voltage to a plurality of capacitors respectively formed in series by the recording medium and a plurality of electrode plates arranged on the head. A space control unit controls a space between the recording medium and the head based on a response of the capacitors to the voltage applied by the voltage applying unit.

20 Claims, 12 Drawing Sheets

APPARATUS FOR CONTROLLING SPACE BETWEEN HEAD AND MEDIUM

BACKGROUND OF THE INVENTION

1. Field of the Invention

The present invention relates to a technology for controlling a space between a head and a recording medium with a capability of controlling levitation amount of the head using electric characteristics between the head and the medium even when the medium is electrically isolated from a ground.

2. Description of the Related Art

In recent years, with an increase in a recording density of a magnetic disk of a magnetic storage device, it is desired to control levitation amount of a head to keep a space between the head and a medium as small as possible. As a control for the levitation amount of the head implemented today, for example, a feed-forward control arranges a heater on the head for heating the head to protrude a magnetic pole section for recording and reproducing data to the medium.

However, in the feed-forward control, when a fluctuation in manufacturing, a change in the atmospheric pressure, or a temperature change occurs, which causes the levitation amount of the head to be dynamically changed, it is likely that the magnetic pole section excessively protrudes, making the head and the medium come into contact with each other.

A system for estimating and controlling the levitation amount of the head using capacitance generated between the head and the medium is disclosed in Japanese Translation of PCT Patent Application No. 2004-518238 and Japanese Patent Application Laid-Open No. H9-91911.

However, in the system disclosed in the conventional technology, it is necessary to ground the medium using some sort of method, making it difficult to practice the system.

This is because, when a medium (such as a magnetic disk) is stored in a magnetic storage device, the medium is electrically isolated from the ground because a bearing, oil, or the like is used to prevent abrasion of a shaft for rotating the medium.

Therefore, even when the medium is electrically isolated from the ground, it is extremely important to control the levitation amount of the head using electric characteristics between the head and the medium.

SUMMARY OF THE INVENTION

It is an object of the present invention to at least partially solve the problems in the conventional technology.

An apparatus for controlling a space between a head and a recording medium, according to one aspect of the present invention, includes a voltage applying unit that applies a voltage to a plurality of capacitors respectively formed in series by the recording medium and a plurality of electrode plates arranged on the head; and a space control unit that controls a space between the recording medium and the head based on a response of the capacitors to the voltage applied by the voltage applying unit.

A storage apparatus according to another aspect of the present invention includes a recording medium for recording data; a head for accessing the data recorded on the recording medium; and a space control apparatus that controls a space between the head and the recording medium. The space control apparatus includes a voltage applying unit that applies a voltage to a plurality of capacitors respectively formed in series by the recording medium and a plurality of electrode plates arranged on the head; and a space control unit that controls the space between the head and the recording medium based on a response of the capacitors to the voltage applied by the voltage applying unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

According to the present invention, a voltage is applied to a plurality of capacitors connected in series by a magnetic disk and a plurality of electrode plates arranged on a head. A space between the magnetic disk and the head is controlled based on a response (impedance, capacitance, etc.) of the capacitors to the voltage applied.

According to the present invention, the capacitors are formed in series by the electrode plates and the magnetic disk, so that it is unnecessary to connect the magnetic disk to a ground. Thus, even when the magnetic disk is electrically separated from the ground, it is possible to accurately control a space between the magnetic disk and the head based on a response of the capacitors.

Figure 1:
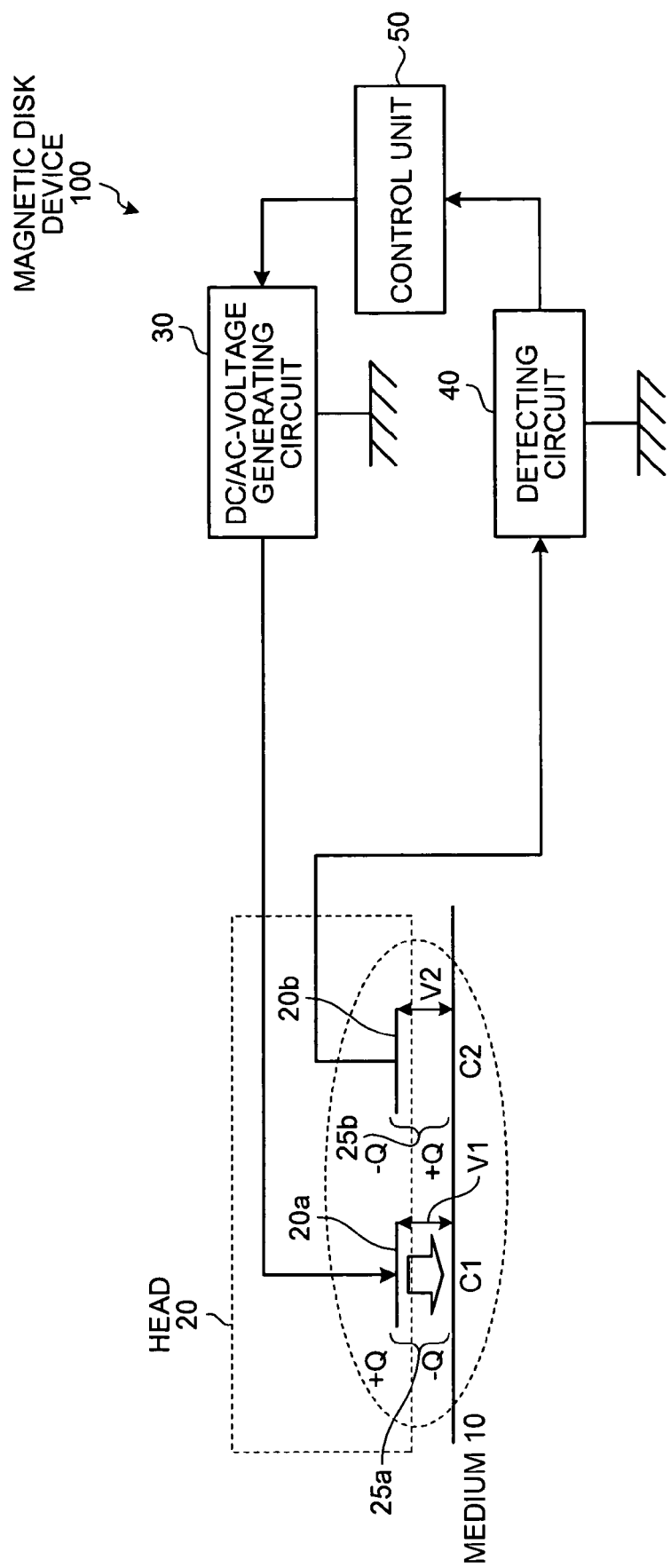
FIG. 1 is a functional block diagram of a basic constitution of a magnetic disk device according to the present invention.

FIG. 1 is a functional block diagram of a basic constitution of a magnetic disk device 100 according to the present invention. The magnetic disk device 100 includes a medium 10, a head 20, a DC/AC-voltage generating circuit 30, a detecting circuit 40, and a control unit 50.

The medium 10 is a recording medium that is applied with a magnetic substance and records data by changing a direction of magnetization. The head 20 is a device that records data on and reproduces data from the medium 10. According to the present invention, the head 20 mainly includes electrode plates 20a and 20b. Two capacitors are formed by the electrode plate 20a and the medium 10 and the electrode plate 20b and the medium 10, respectively. In the following explanation, the capacitor formed by the electrode plate 20a and the medium 10 is referred to as a capacitor 25a and the capacitor formed by the electrode plate 20b and the medium 10 is referred to as a capacitor 25b.

The capacitors 25a and 25b may be regarded as capacitors connected in series. Thus, the capacitors connected in series are formed by the medium 10 and the head 20. The medium 10 does not have to be electrically connected to the ground.

When the capacitance of the capacitor 25a is $C_1$ and the capacitance of the capacitor 25b is $C_2$, it is possible to represent combined capacitance C of the capacitors 25a and 25b connected in series as $$C = \frac{C_1 \times C_2}{C_1 + C_2} \tag{1}$$

The DC/AC-voltage generating circuit 30 is a device that applies a voltage (an AC voltage or a DC voltage) to the capacitors 25a and 25b. When the DC/AC-voltage generating circuit 30 applies a DC voltage to the capacitors 25a and 25b, a charge of +Q/−Q is generated in the capacitors 25a and 25b and attraction (Coulomb attraction) is generated between the medium 10 and the head 20.

The detecting circuit 40 is a device that detects, when an AC voltage is applied to the capacitors 25a and 25b by the DC/AC-voltage generating circuit 30, a response (impedance or capacitance) of the capacitors 25a and 25b to the AC voltage applied and passes information on the response detected (hereinafter, "detection information") to the control unit 50.

The control unit 50 is a device that judges a space between the medium 10 and the head 20 based on the detection information acquired from the detecting circuit 40 and controls, according to the space judged, intensity of a voltage applied to the capacitors 25a and 25b by the DC/AC-voltage generating circuit 30.

The control unit 50 holds information on an optimum space between the medium 10 and the head 20 (hereinafter, "optimum space information") and adjusts intensity of a voltage output from the DC/AC-voltage generating circuit 30 by comparing the optimum space information with information on a space judged based on the detection information (hereinafter, "judged space information").

When the judged space information indicates that a space between the medium 10 and the head 20 is larger than the optimum space, the control unit 50 increases intensity of a DC voltage output from the DC/AC-voltage generating circuit 30. When the intensity of the DC voltage output from the DC/AC-voltage generating circuit 30 is increased, the attraction between the medium 10 and the head 20 increases, and it is possible to reduce the space between the medium 10 and the head 20.

When the judged space information indicates that the space between the medium 10 and the head 20 is smaller than the optimum space, the control unit 50 decreases the intensity of the DC voltage output from the DC/AC-voltage generating circuit 30. When the intensity of the DC voltage output from the DC/AC-voltage generating circuit 30 is decreased, the attraction between the medium 10 and the head 20 decreases, and it is possible to increase the space between the medium 10 and the head 20.

When the judged space information indicates that the space between the medium 10 and the head 20 is optimum, the control unit 50 maintains the intensity of the DC voltage output from the DC/AC-voltage generating circuit 30.

Figure 2:
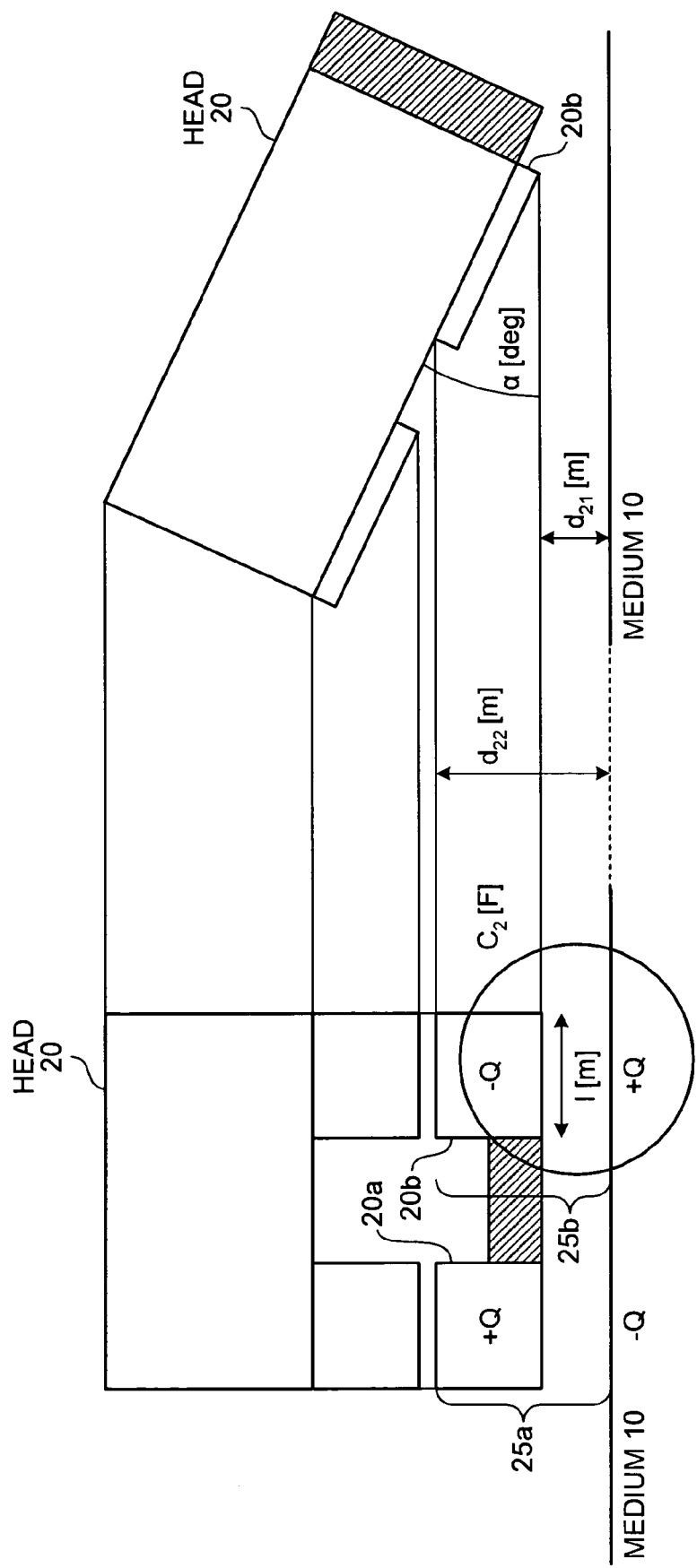
FIG. 2 is a diagram for explaining capacitance charged between a medium and a head and attraction generated between the medium and the head.

FIG. 2 is a diagram for explaining the capacitance charged between the medium 10 and the head 20 and attraction generated between the medium 10 and the head 20.

The capacitance $C_2$ charged between the medium 10 and the electrode plate 20b (charged in the capacitor 25b) is explained below. An explanation of the capacitance $C_1$ charged between the medium 10 and the electrode plate 20a (charged in the capacitor 25a) is omitted. When width of the electrode plate 20b is 1 meter and a space between the medium 10 and the electrode plate 20b is d meter, it is possible to represent the capacitance $C_2$ charged in the capacitor 25b as $$\Delta C_2 = \varepsilon \frac{\Delta S}{d} = \varepsilon \frac{1 \times (\Delta d / \tan\alpha)}{d} \tag{2}$$

As shown in FIG. 2, when the head 20 inclines α degrees and a space between the bottom side of the electrode plate 20b and the medium 10 is $d_{21}$ meter and a space between the top side of the electrode plate 20b and the medium 10 is $d_{22}$ meter, it is possible to represent the capacitance $C_2$ charged in the capacitor 25b as $$C_2 = \int \delta C_2 = \frac{\varepsilon 1}{\tan\alpha} \int_{d_{21}}^{d_{22}} \frac{\Delta d}{d} = \frac{\varepsilon 1}{\tan\alpha} [\ln(d)]_{d_{21}}^{d_{22}} \tag{3}$$

Since the capacitors 25a and 25b are connected in series, it is possible to represent the capacitance C charged between the medium 10 and the head 20 as $C = C_1 \times C_2 / (C_1 + C_2)$.

When a potential energy of the electrode plate 20b is $U_2$ and a voltage applied to the electrode plate 20b is $V_2$, it is possible to represent the potential energy $U_2$ of the electrode plate 20b as $$\Delta U_2 = \frac{V_2^2 \times \Delta C_2}{2} = \frac{V_2^2 \varepsilon}{2} \times \frac{1 \times (\Delta d / \tan\alpha)}{d} = \frac{\varepsilon 1 V_2^2}{2\tan\alpha} \times \frac{\Delta d}{d} \tag{4}$$

Thus, it is possible to represent an attraction $F_2$ generated between the electrode plate 20b and the medium 10 as $$F_2 = \frac{\partial U_2}{\partial d_{21}} = \frac{\partial}{\partial d_{21}} \left\{ \frac{\varepsilon 1 V_2^2}{2\tan\alpha} \times \int_{d_{21}}^{d_{22}} \frac{\delta d}{d} \right\} = \tag{5}$$

$$\frac{\partial}{\partial d_{21}} \left\{ \frac{\varepsilon 1 V_2^2}{2\tan\alpha} \ln\left(\frac{d_{21} - d_2}{d_{21}}\right) \right\} = \frac{\varepsilon 1 V_2^2}{2\tan\alpha} \left( \frac{1}{d_{21} + d_2} - \frac{1}{d_{21}} \right)$$

A value calculated by subtracting $d_{21}$ from $d_{22}$ is substituted in $d_2$ in Equation (5).

Attraction $F_1$ generated between the electrode plate 20a and the medium 10 is explained the same as the attraction $F_2$ generated between the electrode plate 20b and the medium 10, an explanation of the attraction $F_1$ is omitted. It is possible to represent attraction F generated between the medium 10 and the head 20 as $F=F_1+F_2$.

Figure 3:
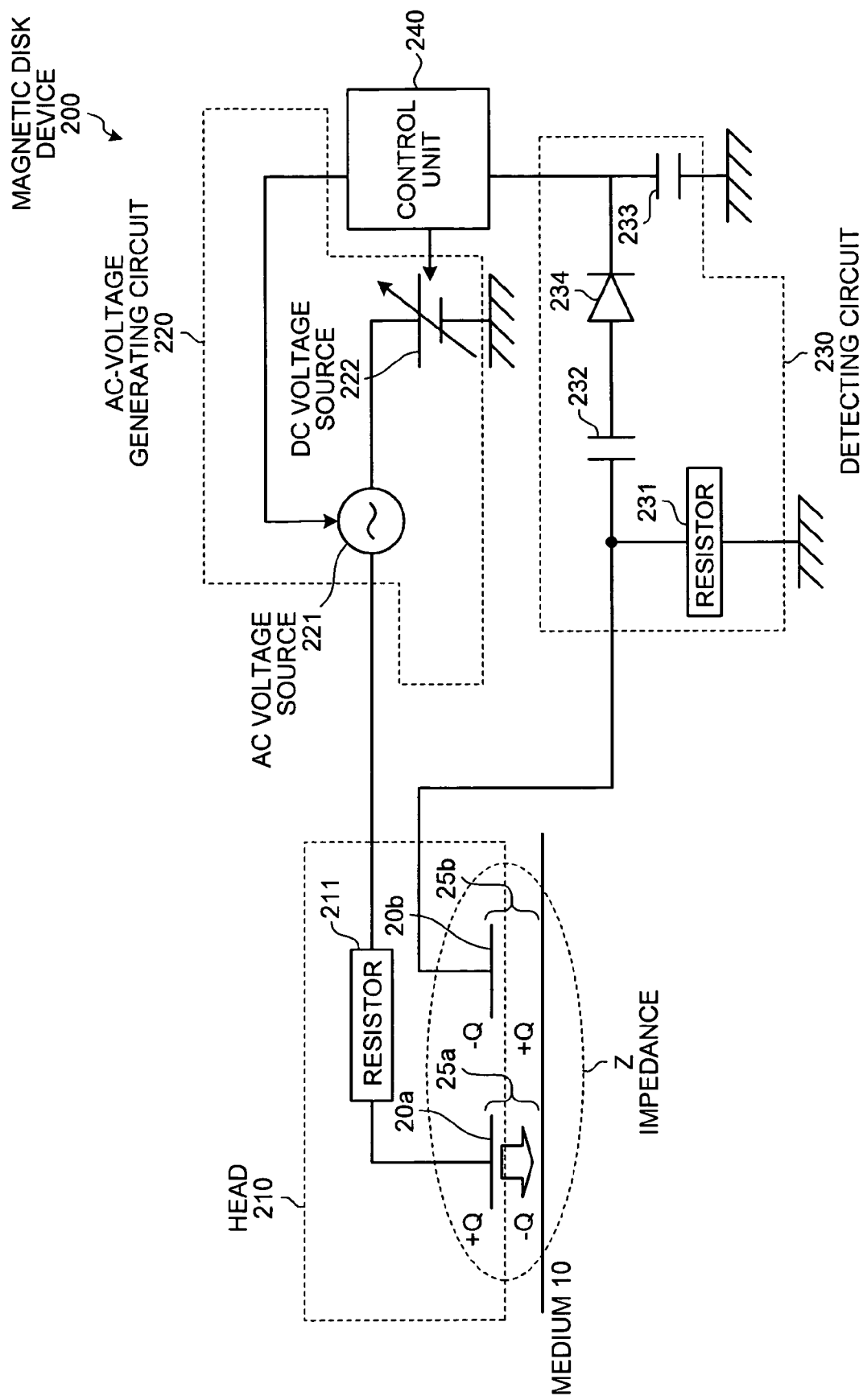
FIG. 3 is a functional block diagram of a constitution of the magnetic disk device according to a first embodiment of the present invention.

FIG. 3 is a functional block diagram of the constitution of the magnetic disk device according to the first embodiment of the present invention. Components of a magnetic disk device 200 identical with those of the magnetic disk device 100 shown in FIG. 1 are denoted by the identical reference numerals and signs. Explanations of the components are omitted.

The magnetic disk device 200 according to the first embodiment includes the medium 10, a head 210, an AC-voltage generating circuit 220, a detecting circuit 230, and a control unit 240. The head 210 includes the electrode plates 20a and 20b and a resistor 211. It is possible to consider that the electrode plate 20a and the medium 10 form the capacitor 25a, the electrode plate 25b and the medium 10 form the capacitor 25b, and the capacitors 25a and 25b are capacitors connected in series. The resistor 211 is an electric resistor for an electric current flowing through the head 210.

The AC-voltage generating circuit 220 includes an AC voltage source 221 and a DC voltage source 222. The AC voltage source 221 is a device that generates an AC voltage applied to the capacitors 25a and 25b. The DC voltage source 222 is a device that generates a DC voltage applied to the capacitors 25a and 25b.

A frequency of a voltage applied to the capacitors 25a and 25b by the AC-voltage generating circuit 220 is set to 50 kilohertz to 100 kilohertz. It is possible to eliminate an influence on recording and reproduction of information recorded on the medium 10 by setting the frequency to 100 megahertz or less. It is possible to eliminate an influence on control of an actuator, to which the head is attached, by setting the frequency to 50 kilohertz or more.

The detecting circuit 230 is a device that detects, when an AC voltage is applied to the capacitors 25a and 25b by the AC-voltage generating circuit 220, impedance and capacitance of the capacitors 25a and 25b for the AC voltage applied and passes information on the impedance and the capacitance detected to the control unit 240 as detection information. The detecting circuit 230 includes a resistor 231, capacitors 232 and 233, and a diode 234.

The control unit 240 is a device that judges a space between the medium 10 and the head 210 based on detection information acquired from the detecting circuit 230 and controls, according to the space judged, intensity of a voltage applied to the capacitors 25a and 25b by the AC-voltage generating circuit 220.

A relation between a space between the medium 10 and the head 210 and R'/(Z+R+R') is explained. R' indicates resistance of the resistor 231 shown in FIG. 3, R indicates resistance of the resistor 211 shown in FIG. 3, and Z indicates impedance applied between the medium 10 and the head 210. For convenience of explanation, R'/(Z+R+R') is referred to as an impedance characteristic.

Figure 4:
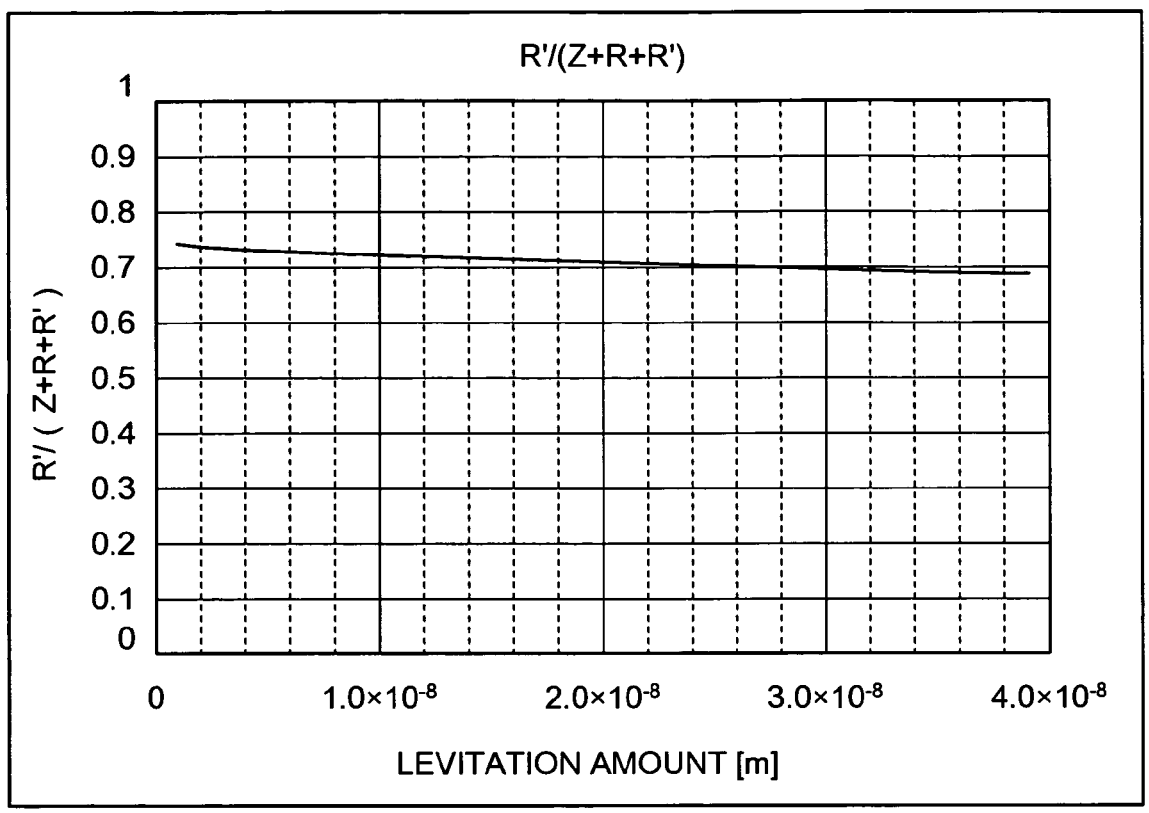
FIG. 4 is a graph of a relation between a space between the medium and the head and an impedance characteristic.

FIG. 4 is a graph of a relation between a space between the medium 10 and the head 210 and an impedance characteristic. As conditions used in FIG. 4, R=1 kΩ, R'=3 kΩ, Vac=20 MHz, S=0.4×0.4 mm, and $\sin \alpha =0.9 \times 10^{-3}$. Vac is a frequency of a voltage output from the AC-voltage generating circuit 220 to measure a space between the medium 10 and the head 210, S is an area of an electrode plate, and α indicates the inclination of the head shown in FIG. 2.

As shown in FIG. 4, as the space between the medium 10 and the head 210 decreases, a value of the impedance characteristic increases. In other words, as the space between the medium 10 and the head 210 decreases, the impedance Z decreases. Information shown in FIG. 4 (hereinafter, "impedance characteristic table") shown in FIG. 4 is held by the control unit 240. The control unit 240 can judge a space between the medium 10 and the head 210 based on information on impedance acquired from the detecting circuit 230 and the impedance characteristic table. For example, when a value of the impedance characteristic is 0.7, the control unit 240 can judge that a space between the medium 10 and the head 210 (levitation amount) is about $3 \times 10^{-8}$ m.

The control unit 240 holds information on an optimum space between the medium 10 and the head 210 (optimum space information) in advance. The control unit 240 compares the optimum space information with judged spaced information judged from the impedance characteristic table and adjusts intensity of a voltage output from the AC-voltage generating circuit 220.

When the judged space information indicates that the space between the medium 10 and the head 210 is larger than the optimum space, the control unit 240 increases intensity of a DC voltage output from the DC voltage source 222. When the intensity of the DC voltage output from the DC voltage source 222 is increased, attraction between the medium 10 and the head 210 increases, and it is possible to reduce the space between the medium 10 and the head 210.

When the judged space information indicates that the space between the medium 10 and the head 210 is smaller than the optimum space, the control unit 240 decreases the intensity of the DC voltage output from the DC voltage source 222. When the intensity of the DC voltage output from the DC voltage source 222 is decreased, the attraction between the medium 10 and the head 210 decreases, and it is possible to increase the space between the medium 10 and the head 210.

When the judged space information indicates that the space between the medium 10 and the head 210 is optimum, the control unit 50 maintains the intensity of the DC voltage output from the DC voltage source 222.

Figure 5:
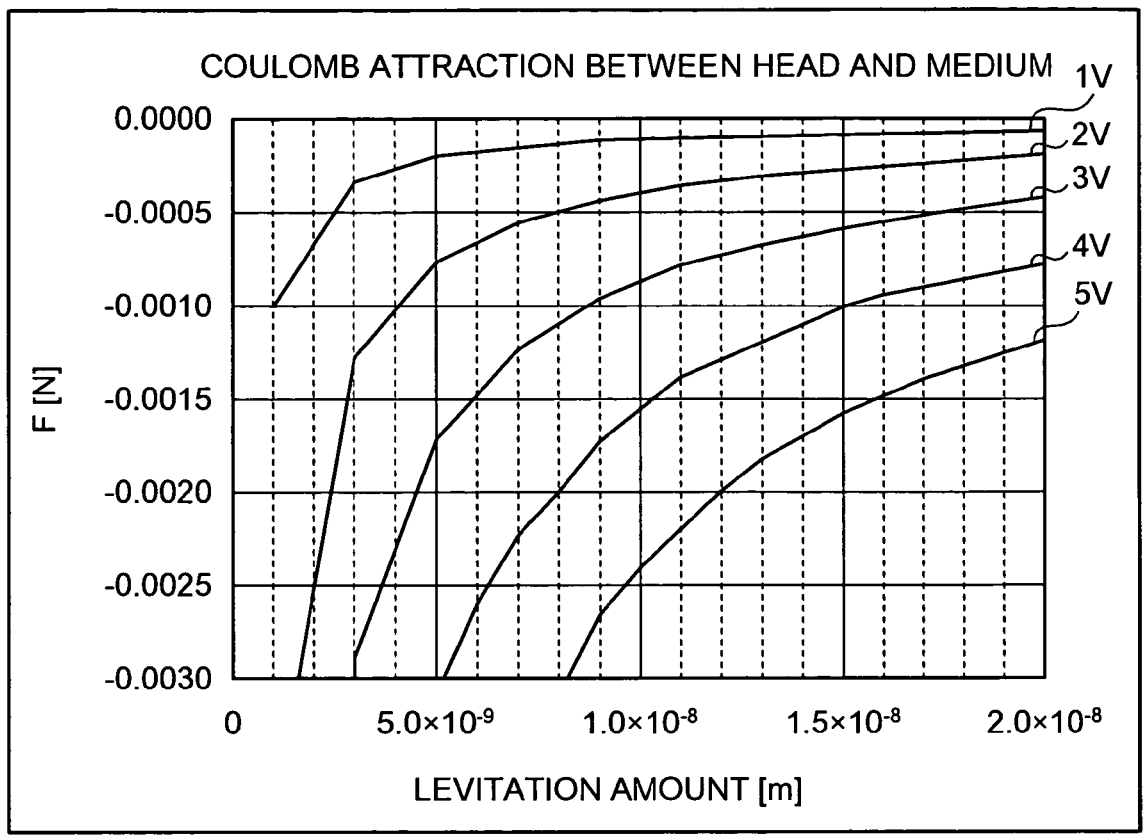
FIG. 5 is a graph of a relation among intensity of a voltage applied to capacitors, a space between the medium and the head, and attraction between the medium and the head.

A relation among intensity of a voltage applied to the capacitors 25a and 25b, a space between the medium 10 and the head 210, and attraction between the medium and the head 210 is explained. FIG. 5 is a graph of a relation among intensity of a voltage applied to the capacitors 25a and 25b, a space between the medium 10 and the head 210, and attraction between the medium 10 and the head 210. As conditions used in FIG. 5, R=1 kΩ, R'=3 kΩ, S=0.4×0.4mm, and $\sin \alpha =0.9 \times 10^{-3}$. As shown in the figure, as the voltage applied to the capacitors 25a and 25b increases and the space between the medium 10 and the head 210 decreases, the attraction increases.

Information shown in FIG. 5 (hereinafter, "attraction information") is held by the control unit 240. The control unit 240 can judge a magnitude of attraction generated between the medium 10 and the head 210 using this attraction information. This makes it possible to control the DC voltage source 222 such that attraction corresponding to a space between the medium 10 and the head 210 is generated.

As described above, in the magnetic disk device 200 according to the first embodiment, the AC-voltage generating circuit 220 applies an AC voltage to the capacitors 25a and 25b connected in series by the medium 10 and the electrode plates 20a and 20b arranged on the head 210. The detecting circuit 230 detects impedance of the capacitors 25a and 25b for the AC voltage applied. The control unit 240 adjusts, based on detection information detected by the detecting circuit 230, intensity of a DC voltage output from the DC voltage source 222. Thus, it is unnecessary to connect the medium 10 to a ground. Even when the medium 10 is electrically separated from the ground, it is possible to accurately control a space between the medium 10 and the head 210.

In the magnetic disk device 200, the AC-voltage generating circuit 220 applies an AC voltage to the capacitors 25a and 25b. However, it is possible to use a digital-signal generating circuit instead of the AC-voltage generating circuit 220.

Figure 6:
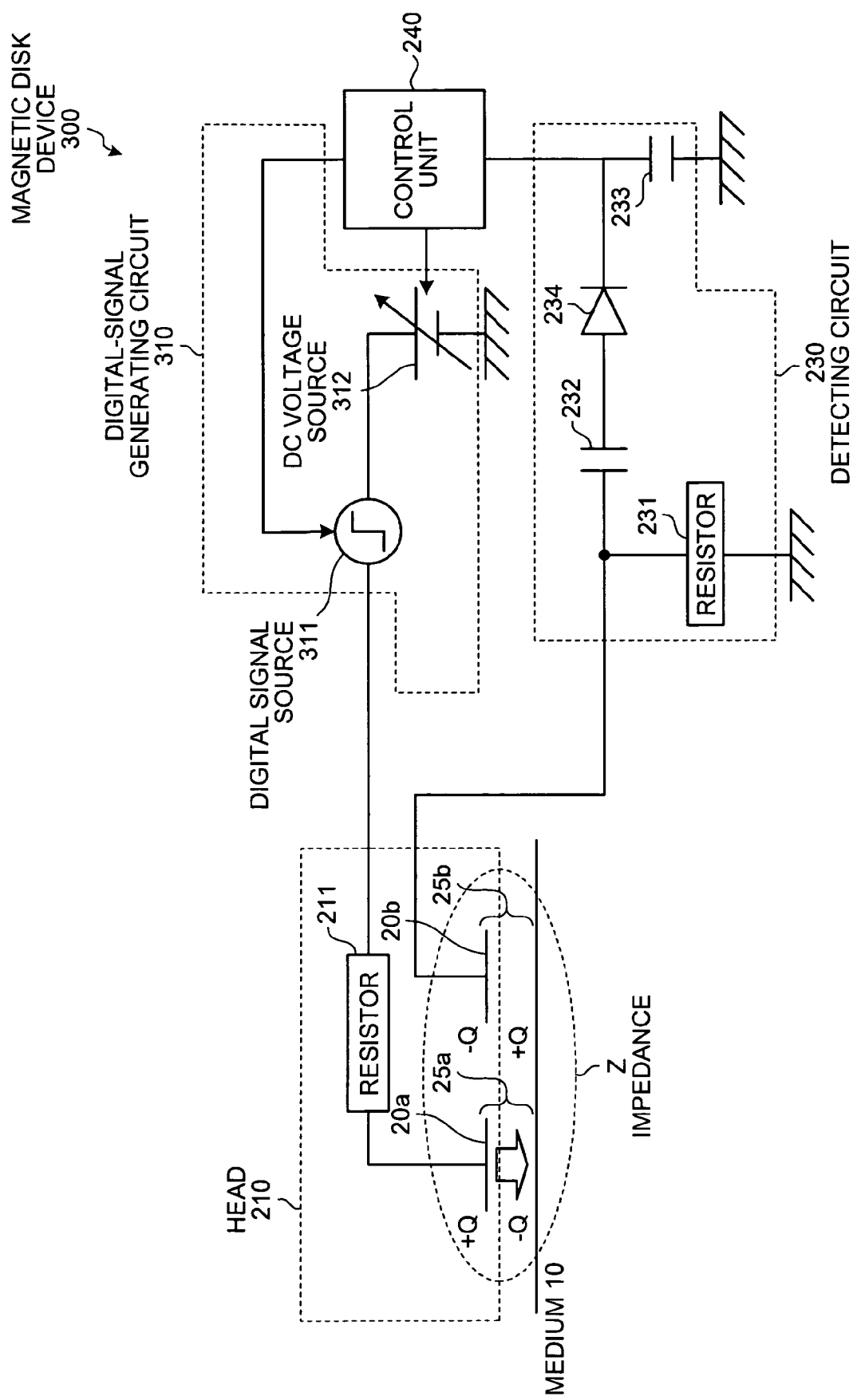
FIG. 6 is a functional block diagram of a constitution of a magnetic disk device that uses a digital-signal generating circuit.

FIG. 6 is a functional block diagram of a constitution of a magnetic disk device 300 using a digital-signal generating circuit. The magnetic disk device 300 includes a digital-signal generating circuit 310 instead of the AC-voltage generating circuit 220 of the magnetic disk device 200 shown in FIG. 3.

The digital-signal generating circuit 310 is a device that applies a pulse pattern to the capacitors 25a and 25b and includes a digital signal source 311 and a DC voltage source 312. The digital signal source 311 is a device that generates a pulse pattern. The DC voltage source 312 is a device that adjusts DC voltage intensity according to a control command from the control unit 240.

It is possible to adjust a frequency of a pulse pattern generated by the digital-signal generating circuit 310 to various frequencies. It is possible to set the frequency to a frequency optimum for impedance detection for the capacitors 25a and 25b. Thus, the detecting circuit 230 can more accurately detect impedance. This makes it possible to accurately adjust a space between the medium 10 and the head 210.

Figure 7:
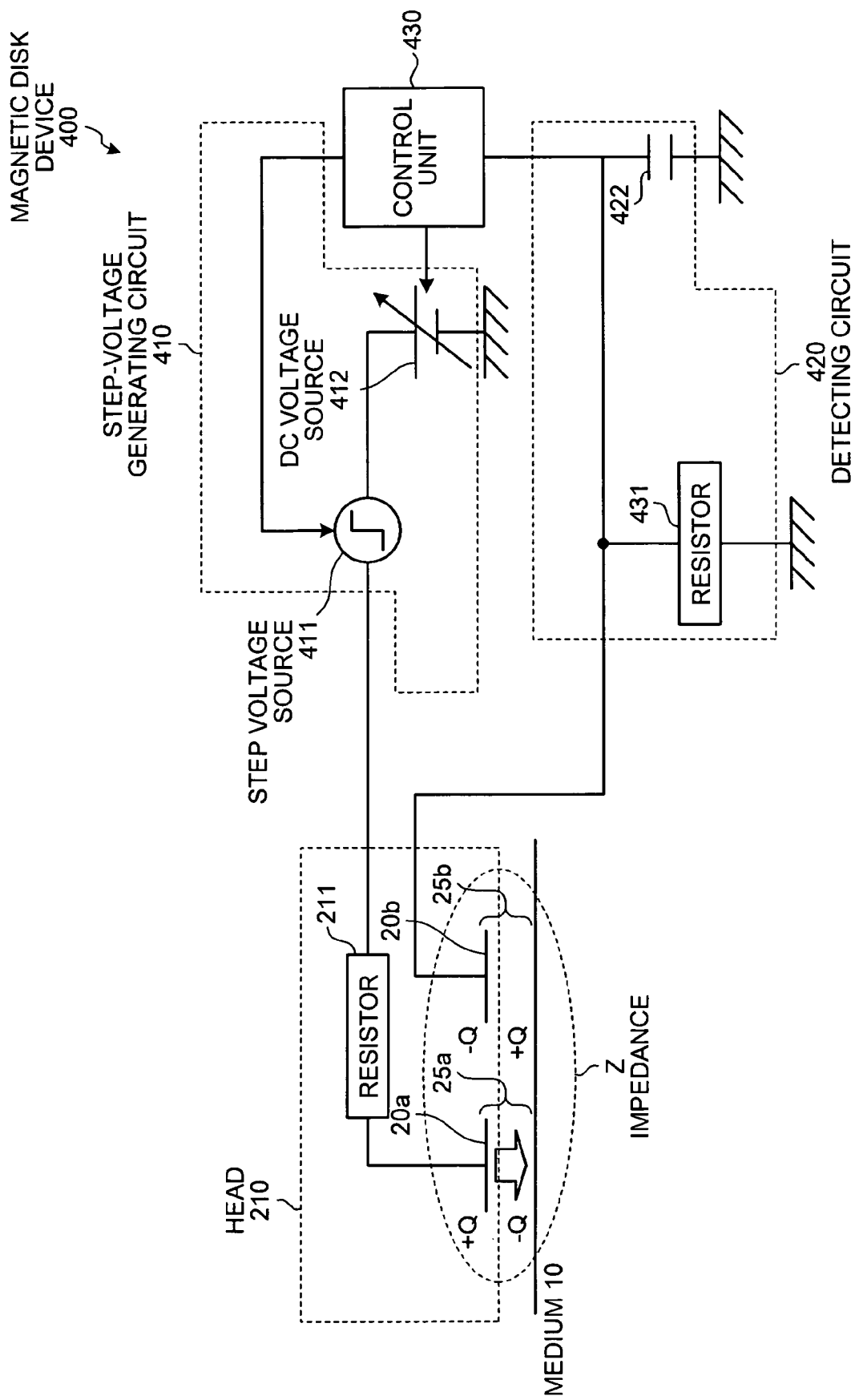
FIG. 7 is a functional block diagram of a constitution of a magnetic disk device according to a second embodiment of the present invention.

A magnetic disk device 400 shown in FIG. 7 according to a second embodiment of the present invention periodically applies a step voltage to capacitors connected in series by a medium and a head and controls a space between the medium and the head based on a response (a time constant) of the capacitors to which the step voltage is applied.

In this way, the magnetic disk device applies a step voltage to the capacitors instead of an AC voltage and controls a space between the medium and the head based on a response of the capacitors to which the step voltage is applied. This makes it possible to accurately control a space between the medium and the head. Further, since a circuit is simplified, it is possible to reduce cost of the entire magnetic disk device.

The magnetic disk device 400 according to the second embodiment includes the medium 10, the head 210, a step-voltage generating circuit 410, a detecting circuit 420, and a control unit 430. Components of the magnetic disk device 400 identical with those of the magnetic disk device 200 shown in FIG. 3 are denoted by the identical reference numerals and signs. Explanations of the components are omitted.

The step-voltage generating circuit 410 is a device that applies a step voltage to the capacitors 25a and 25b and includes a step voltage source 411 and a DC voltage source 412. The step voltage source 411 is a device that generates a step voltage at predetermined intervals and applies the step voltage generated to the capacitors 25a and 25b. The DC voltage source 412 is a device that adjusts, according to a control command of the control unit 430, intensity of a DC voltage for generating attraction between the medium 10 and the head 20.

The detecting circuit 420 is a device that acquires a voltage output from the capacitors 25a and 25b connected in series, detects time until the voltage acquired reaches, for example, 63.2% of a working voltage, that is, a time constant, and passes information on the time constant detected to the control unit 430 as detection information. The detecting circuit 420 includes a resistor 431 and a capacitor 422.

Figure 8:
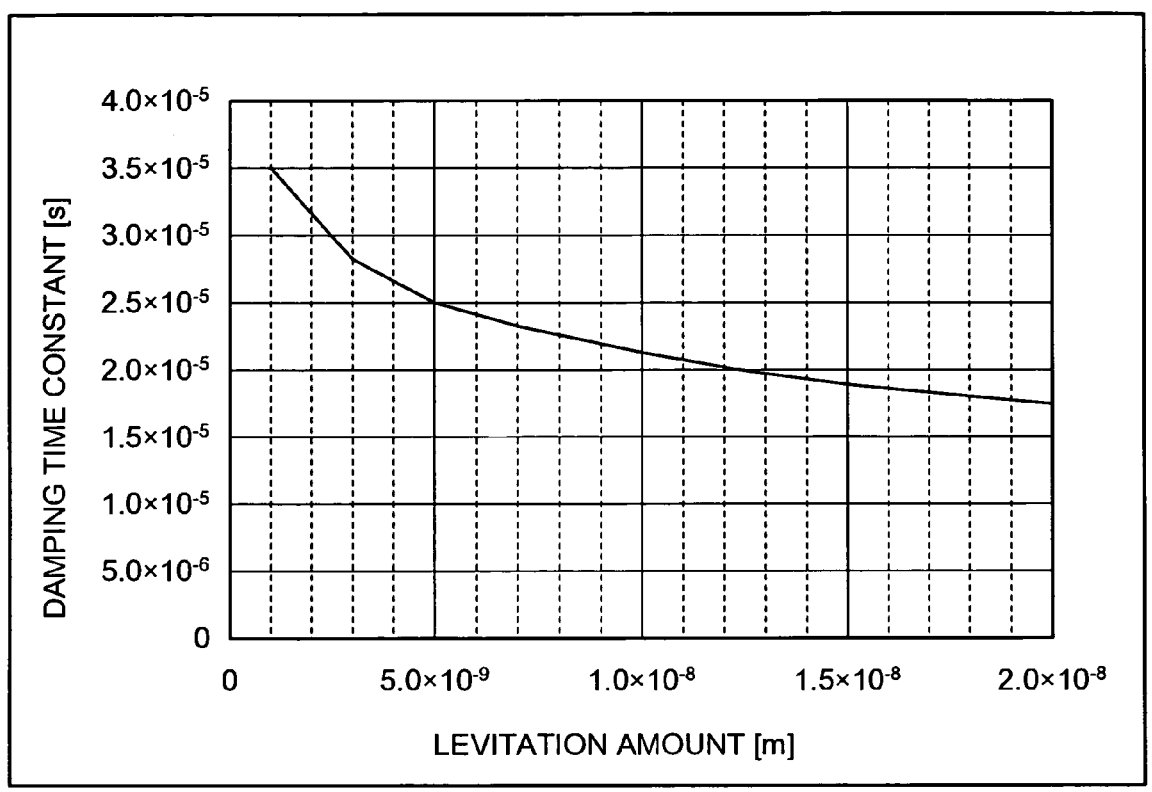
FIG. 8 is a graph of a relation between a space between a medium and a head and a time constant.

A relation between a space between the medium 10 and the head 210 and a time constant is explained. FIG. 8 is a graph of the relation between a space between the medium 10 and the head 210 and a time constant. As shown in the figure, as the space between the medium 10 and the head 210 decreases, the time constant increases. As conditions used in FIG. 8, R=1 kΩ, R' (in the second embodiment, resistance of the resistor 421)=3 kΩ, S=0.4×0.4mm, and sin α=0.9×10$^{-3}$. Information shown in FIG. 8 (hereinafter, "time constant information") is held by the control unit 430.

The control unit 430 is a device that judges a space between the medium 10 and the head 210 based on detection information (information on a time constant) acquired from the detecting circuit 420 and controls, according to the space judged, intensity of a voltage applied to the capacitors 25a and 25b by the step-voltage generating circuit 410.

The control unit 430 holds information on an optimum space between the medium 10 and the head 210 (optimum space information) in advance. The control unit 430 compares the optimum space information with judged space information judged from the time constant information and adjusts intensity of a DC voltage output from the DC voltage source 412. When the time constant is 2.5×10$^{-5}$, the control unit 430 can judge that the space between the medium 10 and the head 210 is about 5.0×10$^{-9}$.

When the judged space information indicates that the space between the medium 10 and the head 210 is larger than the optimum space, the control unit 430 controls the DC voltage source 412 to increase the intensity of the DC voltage. When the intensity of the DC voltage is increased, attraction between the medium 10 and the head 210 increases, and it is possible to reduce the space between the medium 10 and the head 210.

When the judged space information indicates that the space between the medium 10 and the head 210 is smaller than the optimum space, the control unit 430 controls the DC voltage source 412 to decrease the intensity of the DC voltage. When the intensity of the DC voltage is decreased, attraction between the medium 10 and the head 210 decreases, and it is possible to increase the space between the medium 10 and the head 210.

As described above, in the magnetic disk device 400 according to the second embodiment, the step-voltage generating circuit 410 applies a step voltage to the capacitors 25a and 25b connected in series by the medium 10 and the electrode plates 20a and 20b arranged on the head 210. The detecting circuit 420 detects a time constant of the capacitors 25a and 25b for the step voltage applied. The control unit 430 adjusts, based on detection information detected by the detecting circuit 420, intensity of a DC voltage output from the DC voltage source 412. Thus, it is unnecessary to connect the medium 10 to a ground. Even when the medium 10 is electrically separated from the ground, it is possible to accurately control a space between the medium 10 and the head 210.

The magnetic disk device 400 according to the second embodiment controls a space between the medium 10 and the head 210 using a step voltage. Thus, it is possible to simplify a circuit and reduce cost of the magnetic disk device 400.

Figure 9:
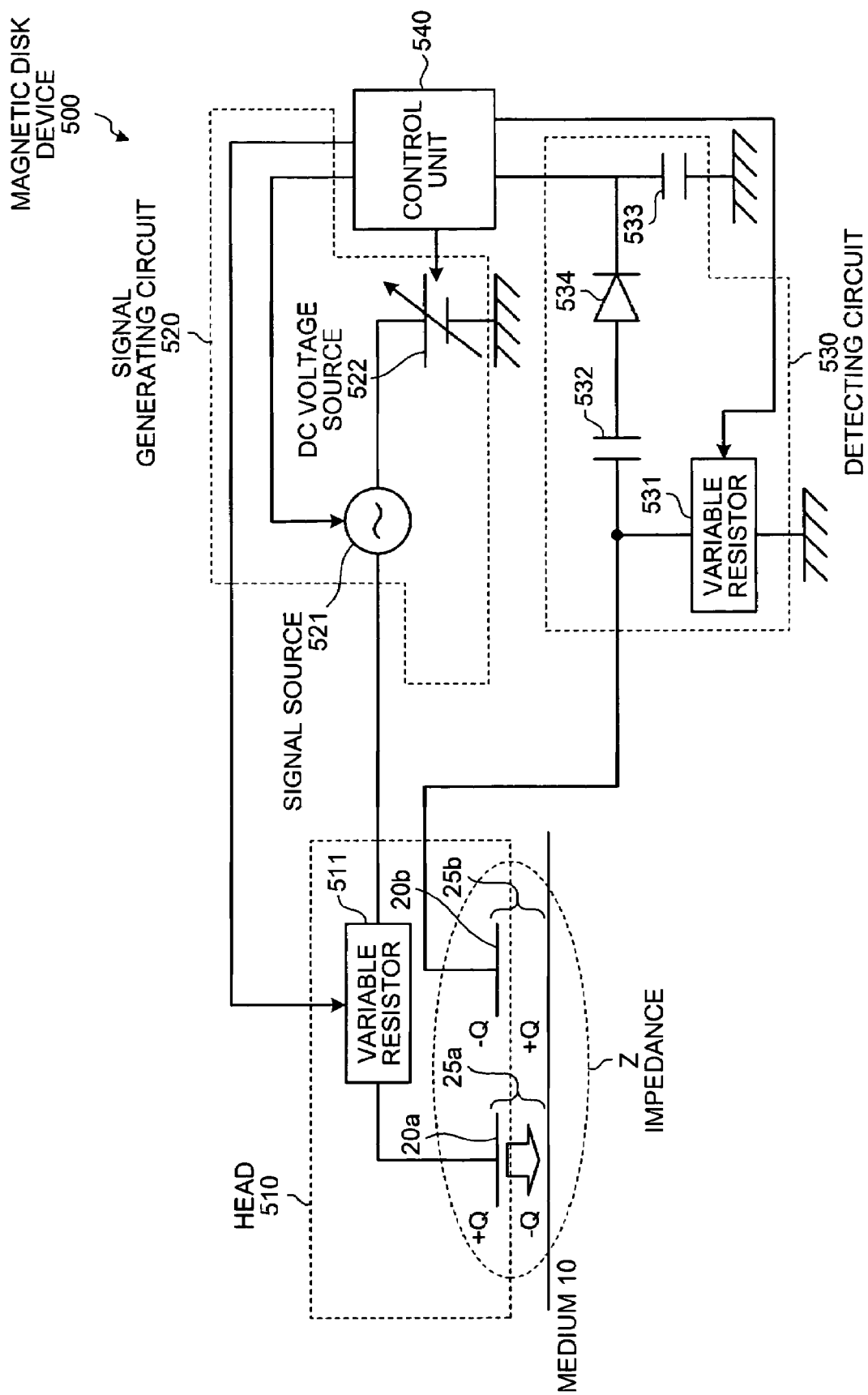
FIG. 9 is a functional block diagram of a constitution of a magnetic disk device according to a third embodiment of the present invention.

A magnetic disk device 500 shown in FIG. 9 according to a third embodiment of the present invention controls a voltage inputted to capacitors and control a space between a medium and a head by changing resistances of variable resistors connected to both sides of the capacitors.

The magnetic disk devices according to the first and the second embodiments need to directly adjust a magnitude of a voltage output from the voltage generator when a space between the medium and the head is controlled. However, the magnetic disk device according to the third embodiment only has to change resistances of the resistors connected to the capacitors. Thus, it is possible to simplify a circuit and reduce cost of the magnetic disk device.

The magnetic disk device 500 according to the third embodiment includes the medium 10, a head 510, a signal generating circuit 520, a detecting circuit 530, and a control unit 540. Components of the magnetic disk device 500 identical with those of the magnetic disk device 200 shown in FIG. 3 are denoted by the identical reference numerals and signs. Explanations of the components are omitted.

The head 510 is a device that records data on and reproduces data from the medium 10. In the third embodiment, the head 510 mainly includes the electrode plates 20*a* and 20*b* and a variable resistor 511. The electrode plates 20*a* and 20*b* are explained the same as the electrode plates 20*a* and 20*b* explained with reference to FIG. 1. Thus, explanations of the electrode plates 20*a* and 20*b* are omitted.

The variable resistor 511 is a device that adjusts a voltage applied to the capacitors 25*a* and 25*b*. The variable resistor 511 changes resistance thereof according to a control command from the control unit 540.

The signal generating circuit 520 is a device that applies a voltage to the capacitors 25*a* and 25*b* and includes a signal source 521 and a DC voltage source 522. The signal source 521 is a device that generates a voltage and applies the voltage generated to the capacitors 25*a* and 25*b*. The DC voltage source 522 is a device that adjusts, according to a command of the control unit 540, intensity of a DC voltage for generating attraction between the medium 10 and the head 20.

The detecting circuit 530 is a device that detects, when a voltage is applied to the capacitors 25*a* and 25*b*, impedance and capacitance for the voltage applied and passes detection information including information on the impedance and the capacitance detected to the control unit 540. The detecting circuit 530 includes a variable resistor 531, capacitors 532 and 533, and a diode 534. The variable resistor 531 is a device that adjusts a voltage applied to the capacitors 25*a* and 25*b*. The variable resistor 531 changes resistance thereof according to a control command from the control unit 540.

The control unit 540 is a device that judges a space between the medium 10 and the head 510 based on detection information acquired from the detecting circuit 530 and controls resistances of the variable resistors 511 and 531 and voltage intensity of the signal generating circuit 520 according to the space judged.

Figure 10:
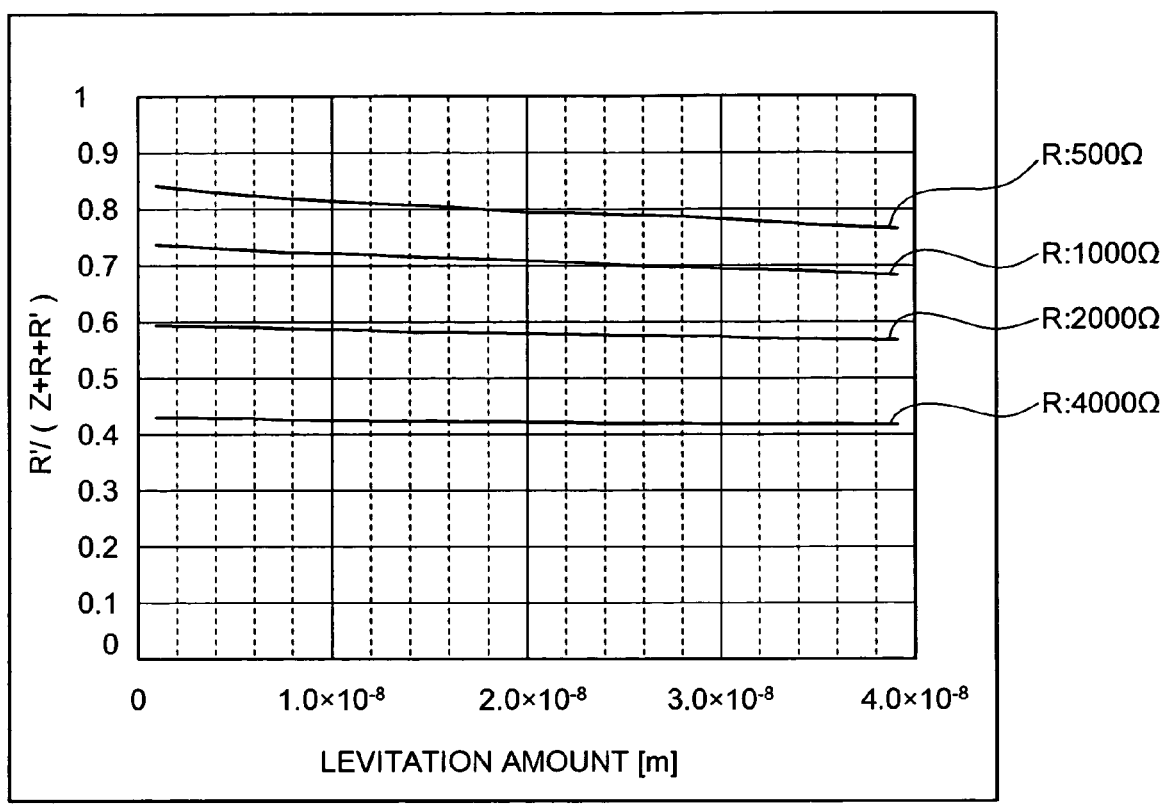
FIG. 10 is a graph of a relation among a space between a medium and a head, an impedance characteristic, and variable resistance.

A relation among a space between the medium 10 and the head 510, an impedance characteristic (R'/(Z+R+R')), and a variable resistance is explained. FIG. 10 is diagram of the relation among a space between the medium 10 and the head 510, an impedance characteristic (R'/(Z+R+R')), and a variable resistance. As conditions used in FIG. 10, R=1 kΩ, Vac=20 MHz, S=0.4×0.4mm, and sin α=0.9×10$^{-3}$. As an example, resistance of the variable resistor 531 is changed to 500 ohms, 1000 ohms, 2000 ohms, and 4000 ohms. As shown in the figure, as the space between the medium 10 and the head 510 decreases, a value of the impedance characteristic increases. As the resistance of the variable resistor 531 increases, a value of the impedance characteristic decreases. Information shown in FIG. 10 (hereinafter, "variable resistance information") is held by the control unit 540.

When a value of the impedance characteristic acquired from the detecting circuit 530 is 0.8 and resistances of the variable resistors 511 and 531 are 3 kilohms and 500 kilohms, respectively, the control unit 540 can judge that the space between the head 510 and the medium 10 is about 2.0×10$^{-8}$.

The control unit 540 holds information on an optimum space between the medium 10 and the head 510 (optimum space information). The control unit 540 compares the optimum space information with judged space information judged from detection information and resistances of the variable resistors. The control unit 540 controls an intensity of voltage applied to the capacitors 25*a* and 25*b* by the signal generating circuit 520 or resistances of the variable resistors 511 and 531. It is possible to represent an AC output voltage V detected by the detecting circuit 530 as $$Vout = Vin \times \frac{R}{R + R' + \frac{1}{C \times S}} \quad (6)$$

where V$_{in}$ is an AC voltage inputted from the signal generating circuit 520, R is resistance of the variable resistor 511, R' is resistance of the variable resistor 531, C is capacitance charged by the capacitors 25*a* and 25*b*, and s is a complex number (jω).

When the judged space information indicates that the space between the medium 10 and the head 510 is larger than the optimum space, the control unit 540 controls the DC voltage source 522 or the variable resistors 511 and 531 to increase the intensity of the DC voltage applied to the capacitors 25*a* and 25*b*. When the intensity of the DC voltage applied to the capacitors 25*a* and 25*b* is increased, attraction between the medium 10 and the head 510 increases, and it is possible to reduce the space between the medium 10 and the head 510.

When the judged space information indicates that the space between the medium 10 and the head 510 is smaller than the optimum space, the control unit 540 controls the DC voltage source 522 or the variable resistors 511 and 531 to decrease the intensity of the DC voltage applied to the capacitors 25*a* and 25*b*. When the intensity of the DC voltage applied to the capacitors 25*a* and 25*b* is decreased, attraction between the medium 10 and the head 510 decreases, and it is possible to increase the space between the medium 10 and the head 510.

When the optimum space information indicates that the space between the medium 10 and the head 510 is optimum, the control unit 540 controls the DC voltage source 522 or the variable resistors 511 and 531 to maintain the intensity of the DC voltage applied to the capacitors 25*a* and 25*b*.

When a frequency of a voltage output from the signal generating circuit 520 is high, it is likely that impedance on the capacitors 25*a* and 25*b* decreases, a voltage generated between the capacitors 25*a* and 25*b* decreases, and an electrostatic force falls. In that case, the control unit 540 can increase the voltage generated between the capacitors 25*a* and 25*b* and keep the electrostatic force by controlling the variable resistors 511 and 531 to set resistances thereof to 0 or as close as 0.

As described above, in the magnetic disk device 500 according to the third embodiment, the signal generating circuit 520 applies a voltage to the capacitors 25*a* and 25*b* connected in series by the medium 10 and the electrode plates 20*a* and 20*b* arranged on the head 510. The detecting circuit 530 detects impedance of the capacitors 25*a* and 25*b* for the voltage applied. The control unit 540 controls the signal generating circuit 520 or the variable resistors 511 and 531 based on detection information detected by the detecting circuit 530. Thus, even when the medium 10 is electrically separated from a ground, it is possible to accurately control a space between the medium 10 and the head 510.

Figure 11:
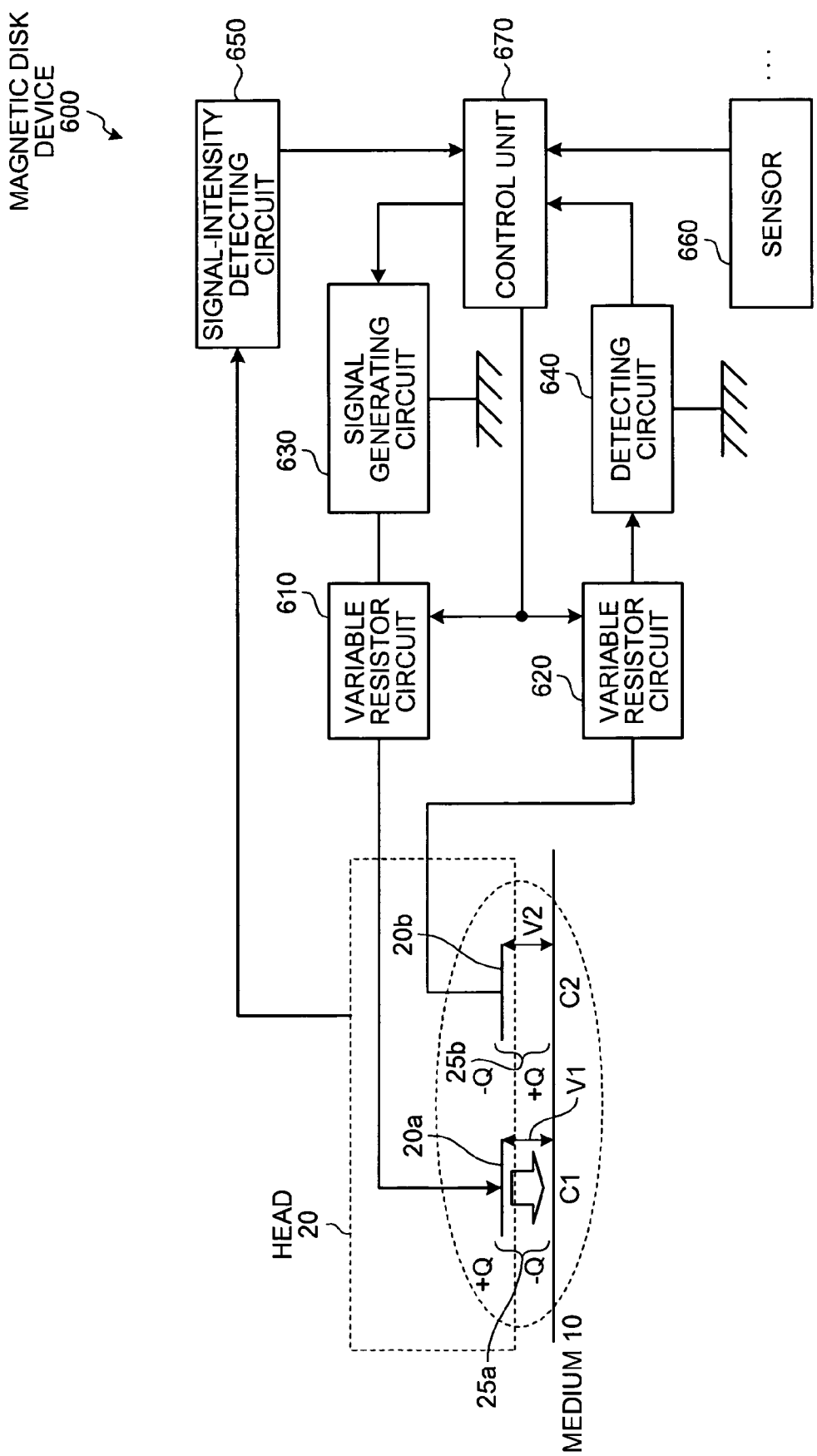
FIG. 11 is a functional block diagram of a constitution of a magnetic disk device according to a fourth embodiment of the present invention.

A magnetic disk device 600 shown in FIG. 11 according to a fourth embodiment of the present invention controls a space between a head and a medium based on, other than a response of capacitors to which a voltage is applied, operating environment information (environment information like temperature, humidity, and a source voltage) of the magnetic disk device and information on signal intensity (signal intensity information) of data recorded in the medium 10.

In this way, the magnetic disk device according to the fourth embodiment controls a space between the head and the medium using the operating environment information and the signal intensity information other than the response of the capacitors. Thus, it is possible to more accurately adjust the space between the head and the medium.

The magnetic disk device 600 according to the fourth embodiment includes the medium 10, the head 20, variable resistor circuits 610 and 620, a signal generating circuit 630, a detecting circuit 640, a signal-intensity detecting circuit 650, a sensor 660, and a control unit 670. Components of the magnetic disk device 600 identical with those of the magnetic disk device 100 shown in FIG. 1 are denoted by the identical reference numerals and signs. Explanations of the components are omitted.

The variable resistor circuits 610 and 620 are devices that change resistance according to a control command from the control unit 670 and change a voltage applied to the capacitors 25a and 25b.

The signal generating circuit 630 is a device that applies a voltage to the capacitors 25a and 25b. When the signal generating circuit 630 applies a voltage to the capacitors 25a and 25b, a charge of +Q/−Q is generated in the capacitors 25a and 25b and attraction (Coulomb attraction) is generated between the medium 10 and the head 20.

The detecting circuit 640 is a device that detects, when a voltage is applied to the capacitors 25a and 25b by the signal generating circuit 630, a response (impedance and capacitance) of the capacitors 25a and 25b to the voltage applied and passes information on the response detected (detection information) to the control unit 670.

The signal-intensity detecting circuit 650 is a device that detects intensity of a signal recorded on the medium 10 and passes information on the signal intensity detected to the control unit 670 as signal intensity information. Large signal intensity indicates that the head 20 is close to the medium 10. Small signal intensity indicates that the head 20 is apart from the medium 10.

The sensor 660 is a device that acquires information on an operating environment around the magnetic disk device 600, such as temperature, humidity, and a source voltage of the magnetic disk device 600 and passes the information acquired to the control unit 670 as operating environment information. Only the sensor 660 is shown in the figure. However, the control unit 670 is connected to a plurality of other sensors and acquires various kinds of operating environment information.

The control unit 670 is a device that judges a space between the medium 10 and the head 20 based mainly on detection information acquired from the detecting circuit 640 and controls, according to the space judged, intensity of a voltage applied to the capacitors 25a and 25b by the signal generating circuit 630.

The control unit 670 holds information on an optimum space between the medium 10 and the head 20 (hereinafter, "optimum space information"). The control unit 670 compares the optimum space information with information on a space judged based on the detection information (hereinafter, "judged spaced information") to adjust intensity of a voltage output from the signal generating circuit 630.

When the judged space information indicates that the space between the medium 10 and the head 20 is larger than the optimum space, the control unit 670 controls the signal generating circuit 630 or the variable resistor circuits 610 and 620 to increase intensity of a DC voltage applied to the capacitors 25a and 25b. When the intensity of the DC voltage applied to the capacitors 25a and 25b is increased, attraction between the medium 10 and the head 20 increases. It is possible to reduce the space between the medium 10 and the head 20.

When the judged space information indicates that the space between the medium 10 and the head 20 is smaller than the optimum space, the control unit 670 controls the signal generating circuit 630 or the variable resistor circuits 610 and 620 to decrease the intensity of the DC voltage applied to the capacitors 25a and 25b. When the intensity of the DC voltage applied to the capacitors 25a and 25b is decreased, attraction between the medium 10 and the head 20 decreases. It is possible to increase the space between the medium 10 and the head 20.

When the judged space information indicates that the space between the medium 10 and the head 20 is optimum, the control unit 670 controls the signal generating circuit 630 or the variable resistor circuits 610 and 620 to maintain the intensity of the DC voltage applied to the capacitors 25a and 25b.

The control unit 670 corrects the optimum space information based on the signal intensity information and the operating environment information acquired from the signal-intensity detecting circuit 650 and the sensor 660. For example, when signal intensity is below a reference value despite the fact that the space between the head 20 and the medium 10 is equal to the space indicated by the optimum space information, the control unit 670 reduces the space indicated by the optimum space information.

The control unit 670 corrects the optimum space information based on the operating environment information. For example, when temperature of the magnetic disk device 600 is higher than the reference value, the control unit 670 increases the space indicated by the optimum space information in view of warp of an arm that supports the head 20.

As described above, in the magnetic disk device 600 according to the fourth embodiment, the signal generating circuit 630 applies an AC voltage to the capacitors 25a and 25b connected in series by the medium 10 and the electrode plates 20a and 20b arranged on the head 20. The detecting circuit 640 detects impedance of the capacitors 25a and 25b for the voltage applied. The control unit 670 controls the signal generating circuit 630 or the variable resistor circuits 610 and 620 based on detection information detected by the detecting circuit 640, signal intensity information obtained by the signal-intensity detecting circuit 650, and operating environment information obtained by the sensor. Thus, even when the medium 10 is electrically separated from a ground, it is possible to accurately control the space between the medium 10 and the head 20.

Although not explained in the first to the fourth embodiments, it is possible to calculate inclination of a head by arranging at least three electrode plates on the head and using capacitance of the electrode plates. This allows the control units 50, 240, 430, 540, and 670 to adjust the inclination of the head.

Figure 12:
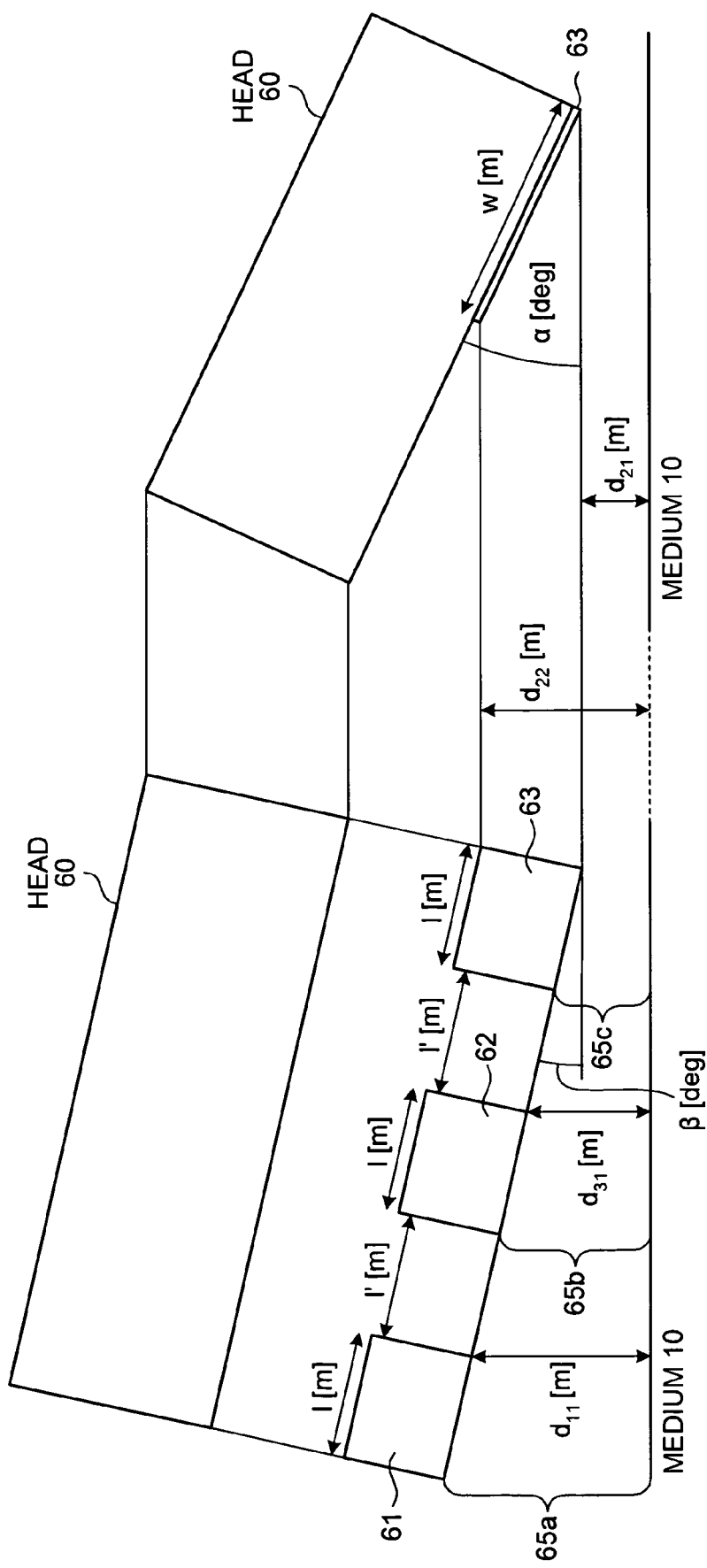
FIG. 12 is a diagram for explaining calculation of inclination of a head.

FIG. 12 is a diagram for explaining calculation of inclination of a head. As shown in the figure, electrode plates 61 to 63 are arranged on a head 60. Width and length of the electrode plates 61 to 63 are l meter and w meter, respectively. The electrode plates 61 to 63 are arranged at l' meter intervals, respectively. Capacitance of a capacitor 65a formed by the electrode plate 61 and the medium 10 is $C_1$, capacitance of a capacitor 65b formed by the electrode plate 62 and the medium 10 is $C_3$, and capacitance of a capacitor 65c formed by the electrode plate 63 and the medium 10 is $C_2$. An explanation concerning the capacitance is the same as Equation (2) explained in the first embodiment. Thus, the explanation is omitted.

It is possible to represent the capacitance $C_1$, the capacitance $C_2$, and the capacitance $C_3$ as $$C_1 = \frac{\varepsilon}{\tan\alpha\sqrt{1-\sin^2\beta}}\left\{\begin{array}{c}(w\sin\alpha+d_{11}+1\sin\beta)\ln(w\sin\alpha+d_{11}+1\sin\beta) - \\ (d_{11}+1\sin\beta)\ln(d_{11}+1\sin\beta)+w\sin\alpha\end{array}\right\} \quad (7)$$

$$C_2 = \frac{\varepsilon}{\tan\alpha\sqrt{1-\sin^2\beta}}\left\{\begin{array}{c}(w\sin\alpha+d_{21}+1\sin\beta)\ln(w\sin\alpha+d_{21}+1\sin\beta) - \\ (d_{21}+1\sin\beta)\ln(d_{21}+1\sin\beta)+w\sin\alpha\end{array}\right\} \quad (8)$$

$$C_3 = \frac{\varepsilon}{\tan\alpha\sqrt{1-\sin^2\beta}}\left\{\begin{array}{c}(w\sin\alpha+d_{31}+1\sin\beta)\ln(w\sin\alpha+d_{31}+1\sin\beta) - \\ (d_{31}+1\sin\beta)\ln(d_{31}+1\sin\beta)+w\sin\alpha\end{array}\right\} \quad (9)$$

where $d_{11}$ is a distance between the electrode plate 61 and the medium 10, $d_{21}$ is a distance between the electrode plate 63 and the medium 10, and $d_{31}$ is a distance between the electrode plate 62 and the medium 10.

When it is considered that the capacitors 65b and 65c are connected in series, it is possible to represent capacitance $C_{3-2}$ of the capacitors 65b and 65c as $$C_{3-2} = \frac{C_3 \times C_2}{C_3 + C_2} \quad (10)$$

When it is considered that the capacitors 65a and 65b are connected in series, it is possible to represent capacitance $C_{1-3}$ of the capacitors 65a and 65b as $$C_{1-3} = \frac{C_1 \times C_3}{C_1 + C_3} \quad (11)$$

The values $C_{3-2}$ and $C_{1-3}$ on the left sides of Equations (10) and (11) are known values because it is possible to perform capacitance measurement using the detecting circuit or the like described in the embodiments.

From a relation shown in FIG. 12, the following equations are established.

$$d_{31}=d_{21}+(l+l')\sin\beta \quad (12)$$

$$d_{11}=d_{21}+2\times(l+l')\sin\beta \quad (13)$$

A control unit can calculates inclination $\beta$ and levitation amount $d_{21}$ of the head 60 by using Equations (7) to (13) (it is assumed that $\alpha$, l, l', and w are known values).

Therefore, the control unit can calculate inclination of the head 60 based on the capacitances of the capacitors 65a, 65b, and 65c and, when the inclination of the head 60 is not appropriate, adjust the inclination of the head 60 by controlling a voltage applied to the capacitors 65a, 65b, and 65c.

The embodiments are explained with the magnetic disk apparatus as an example. The present invention is not limited to the magnetic disk device. It is possible to apply the present invention to storage devices such as an optical disk device and a thermomagnetic disk device that use heads like a magnetic field applying head and an optical head of a levitation type.

According to an embodiment of the present invention, the applying unit applies a voltage to the capacitors connected in series by the recording medium and the electrode plates arranged on the head and the space control unit controls a space between the recording medium and the head based on a response of the capacitors to the voltage applied. Thus, even when the recording medium is electrically separated from a ground, it is possible to accurately control the space between the head and the recording medium.

Furthermore, according to an embodiment of the present invention, the space control unit controls a space between the recording medium and the head using an electrostatic force generated between the recording medium and the head. Thus, it is possible to accurately adjust levitation amount of the head.

Moreover, according to an embodiment of the present invention, the applying unit applies an AC voltage to the capacitors and controls a space between the recording medium and the head based on impedance of the capacitors. Thus, it is possible to accurately control the space between the head and the recording medium.

Furthermore, according to an embodiment of the present invention, the applying unit applies a pulse voltage to the capacitors and controls a space between the recording medium and the head based on impedance of the capacitors. Thus, it is possible to easily set an optimum frequency for the capacitors and accurately adjust the space between the head and the recording medium.

Moreover, according to an embodiment of the present invention, the applying unit applies a step signal to the capacitors and controls a space between the recording medium and the head based on a time constant of the capacitors. Thus, it is possible to simplify a circuit and hold down manufacturing cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for controlling a space between a head and a recording medium in a magnetic disk device, the apparatus comprising:
    a voltage applying unit that applies a voltage between electrode plates arranged on the head to form a plurality of capacitors in series between the head and the recording medium; and
    a space control unit that measures and controls the space between the head and the recording medium based on a response to change of the voltage applied by the voltage applying unit.

2. The apparatus according to claim 1, wherein
    the space control unit controls the space between the head and the recording medium using an electrostatic force generated between the recording medium and the head.

3. The apparatus according to claim 1, further comprising an inclination control unit that controls an inclination of the head based on capacitance of the capacitors.

4. The apparatus according to claim 1, wherein
    the voltage applying unit applies an alternate-current voltage to the capacitors, and
    the space control unit controls the space between the head and the recording medium based on impedance of the capacitors.

5. The apparatus according to claim 4, wherein
a frequency of the alternate-current voltage applied to the capacitors by the voltage applying unit is in a range between 50 kilohertz and 100 kilohertz.

6. The apparatus according to claim 1, wherein
the voltage applying unit applies a pulse voltage to the capacitors, and
the space control unit controls the space between the head and the recording medium based on impedance of the capacitors.

7. The apparatus according to claim 6, further comprising a pulse-frequency changing unit that changes a frequency of the pulse voltage.

8. The apparatus according to claim 1, wherein
the voltage applying unit applies a step signal to the capacitors, and
the space control unit controls the space between the head and the recording medium based on a time constant of the capacitors.

9. The apparatus according to claim 1, further comprising a signal-intensity detecting unit that detects a signal intensity of data recorded on the recording medium, wherein
the space control unit controls the space between the head and the recording medium based on the detected signal intensity.

10. The apparatus according to claim 1, further comprising an environment-information acquiring unit that acquires information on an operating environment around the magnetic disk device, including temperature, humidity, and a source voltage of the magnetic disk device, wherein
the space control unit controls the space between the head and the recording medium based on the information on the operating environment.

11. The apparatus according to claim 1, further comprising a voltage adjusting unit that changes resistance of resistors connected to the capacitors to adjust a voltage of the capacitors.

12. A storage apparatus comprising:
a recording medium for recording data;
a head for accessing the data recorded on the recording medium; and
a space control apparatus that controls a space between the head and the recording medium, wherein
the space control apparatus includes
a voltage applying unit that applies a voltage between electrode plates arranged on the head to form a plurality of capacitors in series between the head and the recording medium; and
a space control unit that measures and controls the space between the head and the recording medium based on a response to change of the voltage applied by the voltage applying unit.

13. The storage apparatus according to claim 12, wherein
the space control unit controls the space between the head and the recording medium using an electrostatic force generated between the recording medium and the head.

14. The storage apparatus according to claim 12, wherein
the space control device further includes an inclination control unit that controls an inclination of the head based on capacitance of the capacitors.

15. The storage apparatus according to claim 12, wherein
the voltage applying unit applies an alternate-current voltage to the capacitors, and
the space control unit controls the space between the head and the recording medium based on impedance of the capacitors.

16. The storage apparatus according to claim 12, wherein
the voltage applying unit applies a pulse voltage to the capacitors, and
the space control unit controls the space between the head and the recording medium based on impedance of the capacitors.

17. The storage apparatus according to claim 12, wherein
the voltage applying unit applies a step signal to the capacitors, and
the space control unit controls the space between the head and the recording medium based on a time constant of the capacitors.

18. The storage apparatus according to claim 12, wherein
the space control apparatus further includes a signal-intensity detecting unit that detects a signal intensity of data recorded on the recording medium, and
the space control unit controls the space between the head and the recording medium based on the detected signal intensity.

19. The storage apparatus according to claim 12, wherein
the space control apparatus further includes an environment-information acquiring unit that acquires information on an operating environment around the magnetic disk device, including temperature, humidity, and a source voltage of the magnetic disk device, and
the space control unit controls the space between the head and the recording medium based on the information on the operating environment.

20. The storage apparatus according to claim 12, wherein
the space control apparatus further includes a voltage adjusting unit that changes resistance of resistors connected to the capacitors to adjust a voltage of the capacitors.

\* \* \* \* \*